United States Patent [19]

Harats et al.

[11] Patent Number: 5,447,805
[45] Date of Patent: Sep. 5, 1995

[54] CELL FOR A METAL-AIR BATTERY

[75] Inventors: Yehuda Harats; Boris Dechovich; Menachem Korall, all of Jerusalem, Israel

[73] Assignee: Electric Fuel (E.F.L.) Ltd., Jerusalem, Israel

[21] Appl. No.: 275,588

[22] Filed: Jul. 15, 1994

Related U.S. Application Data

[63] Continuation-in-part of Ser. No. 213,674, Mar. 15, 1994, Pat. No. 5,366,822.

[51] Int. Cl.[6] .......................................... H01M 12/06
[52] U.S. Cl. ................................... 429/27; 429/26; 429/34; 429/72
[58] Field of Search .................. 429/27, 26, 34, 62, 429/72, 149, 120

[56] References Cited

U.S. PATENT DOCUMENTS

| | | | |
|---|---|---|---|
| 4,620,111 | 10/1986 | McArthur et al. | 429/27 X |
| 4,640,874 | 2/1987 | Kelm | 429/27 |
| 5,242,763 | 9/1993 | Konishi et al. | 429/27 |
| 5,366,822 | 11/1994 | Korall et al. | 429/27 |

*Primary Examiner*—Anthony Skapars
*Attorney, Agent, or Firm*—Helfgott & Karas

[57] ABSTRACT

A modular cell for a multi-cell metal-air battery system, comprises a relatively flat cell housing having two major surfaces and accommodating a pair of oppositely disposed, spaced-apart, air-permeable, liquid-impermeable cathodes in the form of air electrodes defining between themselves a space open towards the upper edges of the cell housing and closed at the lateral edges and the bottom of the cell housing, the space being configured to accommodate an anode of said battery, substantial portions of the major surfaces of the housing being removed, thus exposing major portions of the air electrodes. The two major surfaces of the housing are partly recessed in such a way as to form, in conjunction with a similarly recessed outer surface of a major wall of an adjacent cell housing, an air space with air access and exits, and the exposed portions of the air electrodes are supported and reinforced by ribbing constituted at least by a plurality of slender rails, which rails define ducts for guiding a flow of air across the portions of the air electrodes from the air access toward the exits. An upper portion of at least one major surface of the housing is provided with a fluid flow channel having an inlet and an outlet provided in a wall of a minor surface of the housing for guiding a cooling fluid introduced into the inlet across an upper area of the cell, in heat exchange with electrolyte contained in upper portions of the open space, via an inner wall of the housing portion.

23 Claims, 4 Drawing Sheets

CELL FOR A METAL-AIR BATTERY

The present specification is a continuation-in-part of U.S. Ser. No. 08/213,674, filed Mar. 15, 1994, now U.S. Pat. No. 5,366,822.

The present invention relates to a modular cell for a multi-cell cooled metal-air battery system, more particularly for such a system to be used in electrically powered vehicles.

While the performance of the cell according to the above application (as well as of the gas diffusion electrode disclosed in U.S. Pat. No. 5,312,701, the teachings of which are incorporated herein by reference) proved to be superior to the prior art batteries with respect to the most important parameters of batteries for electric vehicles, namely, high continuous current drain as well as short term high peak power output and high energy content, these cells were not quite satisfactory concerning certain practical aspects of their suitability for the above purpose: The battery design was not fully optimized for compactness, the relatively delicate air cathode was not sufficiently supported to produce stability and counteract bulging, and cooling, that is, carrying off the heat generated as byproduct of the electrochemical reaction, was not efficient enough to maintain an acceptable operating temperature also under less favorable climatic conditions.

Another drawback of the prior art metal-air batteries is the rather rudimentary design of the electrical contacts, which does not allow for rapid removal of exhausted anodes and their equally rapid, yet electrically reliable, replacement by fresh ones.

It is thus one of the objects of the present invention to provide a modular cell that is designed for compactness to optimize energy and power densities. It is a further object of the invention to protect and support the air electrode without interfering with air access and to enhance air flow to improve distribution of reaction air to the electrode surfaces. It is yet another object of the invention to provide the anode and cathodes of the cell with electric terminals that will ensure loss-free contacts during operation, while facilitating rapid separation for removal of exhausted anodes and equally rapid and reliable reconnection upon their replacement by fresh anodes. Still another object of the invention is the provision, on the cells, of surface features that facilitate the secure and accurate interlocking of juxtaposed cells to form multicell batteries.

All electric batteries generate heat during operation, one source thereof being the inefficiency of conversion of chemical energy to electrical energy, and the second source being the ohmic resistance of the battery itself. In most batteries, such heat is dissipated naturally, mainly by convection. However, batteries designed to power electric vehicles are designed to provide high power from a compact battery envelope and may exhibit a high temperature rise if no additional provision is made for cooling.

Further aggravating the problem is the consideration that road vehicles need to be designed to allow operation in ambient temperatures as high as 50° C.; under such conditions, the generated heat may raise battery temperature to a level causing long-term battery damage.

While a high operating temperature is not necessarily detrimental to battery performance, there are many reasons justifying some cooling arrangement in a battery of this type. First, in a naturally cooled battery the inner cells will operate at a considerably higher temperature than those on the battery perimeter, leading to operating differentials between the cells. Second, the temperature may rise above that allowed for the plastic parts of the cell, or for the electrolyte. Finally, it is often advantageous to use the heat removed from the battery for the purpose of vehicle interior heating.

It is therefore a further object of the invention to provide a cooling system for said modular cell.

According to the invention, these objects are achieved by providing a modular cell for a multi-cell metal-air battery system, comprising a relatively flat cell housing having two major surfaces and accommodating a pair of oppositely disposed, spaced-apart, air-permeable, liquid-impermeable cathodes in the form of air electrodes defining between themselves a space open towards the upper edges of said cell housing and closed at the lateral edges and the bottom of said cell housing, said space being configured to accommodate an anode of said battery, substantial portions of the major surfaces of said housing being removed, thus exposing major portions of said air electrodes, characterized in that said two major surfaces are partly recessed in such a way as to form, in conjunction with a similarly recessed outer surface of a major wall of an adjacent cell housing, an air space with air access and exits, and that the exposed portions of said air electrodes are supported and reinforced by ribbing constituted at least by a plurality of slender rails, which rails define ducts for guiding a flow of air across said portions of said air electrodes from said air access toward said exits; and further characterized in that an upper portion of at least one major surface of said housing is provided with a fluid flow channel having an inlet provided in a wall of a first minor surface of said housing and an outlet provided in a wall of a second, opposite minor surface of said housing, for guiding a cooling fluid introduced into said inlet across an upper area of said cell, in heat exchange with electrolyte contained in upper portions of said open space, via an inner wall of said housing portion.

Preferably, but not necessarily, said fluid flow channel is in the form of a labyrinth or serpentine path and said fluid is a cooling liquid.

In preferred embodiments of the present invention, the exposed portions of said air electrodes are supported and reinforced by ribbing constituted at least by a plurality of slender, generally upwardly-extending rails, which rails define ducts for air entering said air space from below and exiting it at said upper regions.

Cooling systems for batteries have been well-known in the art for decades.

Thus, e.g., U.S. Pat. No. 3,290,176 and 5,093,213 describe batteries with an electrolyte circulating system for effecting cooling.

Similarly, U.S. Pat. No. 754,969 from the year 1904, and later U.S. Pat. Nos. 4,463,064; 4,324,844; 4,578,324; 4,956,245; 4,945,010 and 5,212,024 all describe various arrangements of circulating flow channels for cooling fluid formed in spacing between cells.

None of said patents, however, teaches or suggests a metal air battery as defined herein, wherein scrubbed air can flow without interruption between adjacent cells to effect the metal-air reaction, while cooling is effected via liquid flow channels provided in the cathode housing itself, and not via a radiator placed external to the cell.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
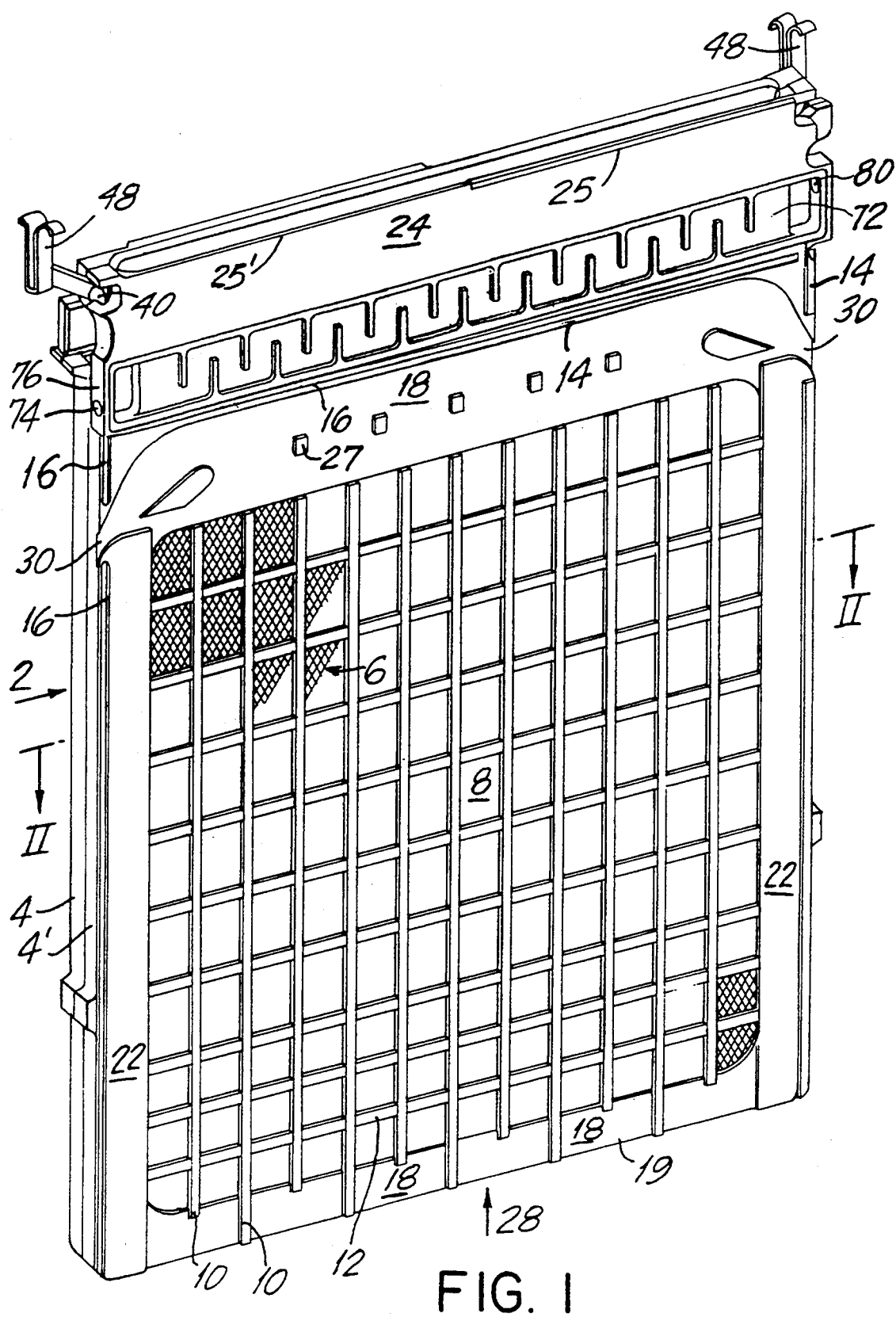
FIG. 1 is a perspective view of the cell according to the invention, with the air cathode in position but without the anode; the fluid flow channel used for cooling being seen near the upper edge of the cell.

Referring now to the drawings, there is seen in FIG. 1 the cell 2 consisting of a split cell housing 4, 4'. The two housing halves 4, 4' are exactly identical and are cemented together during the assembly of the cell 2 (see also FIG. 2).

The two major surfaces of the cell housing 4, 4' (of which only one half, 4', is seen) are provided with window-like openings 8 through which the air cathodes 6 are exposed to air. These openings 8 are defined by a latticework constituted of a plurality of slender, vertically-extending rails 10 linked and reinforced by horizontal webs 12 which, however, are not as thick as the rails 10. The rails 10 and webs 12 support and protect the air cathodes. It is also seen that, closer to the bottom of the cell, spacing between the webs 12 is reduced to provide more support where hydrostatic pressure during removal and insertion of the anode 62 (FIG. 6) is greater. Furthermore, it has now been found that said horizontal webs 12 prevent laminar flow and advantageously create turbulent flow in the air ducts formed by said rails 10, and thus said latticework array is especially preferred.

Figure 2:
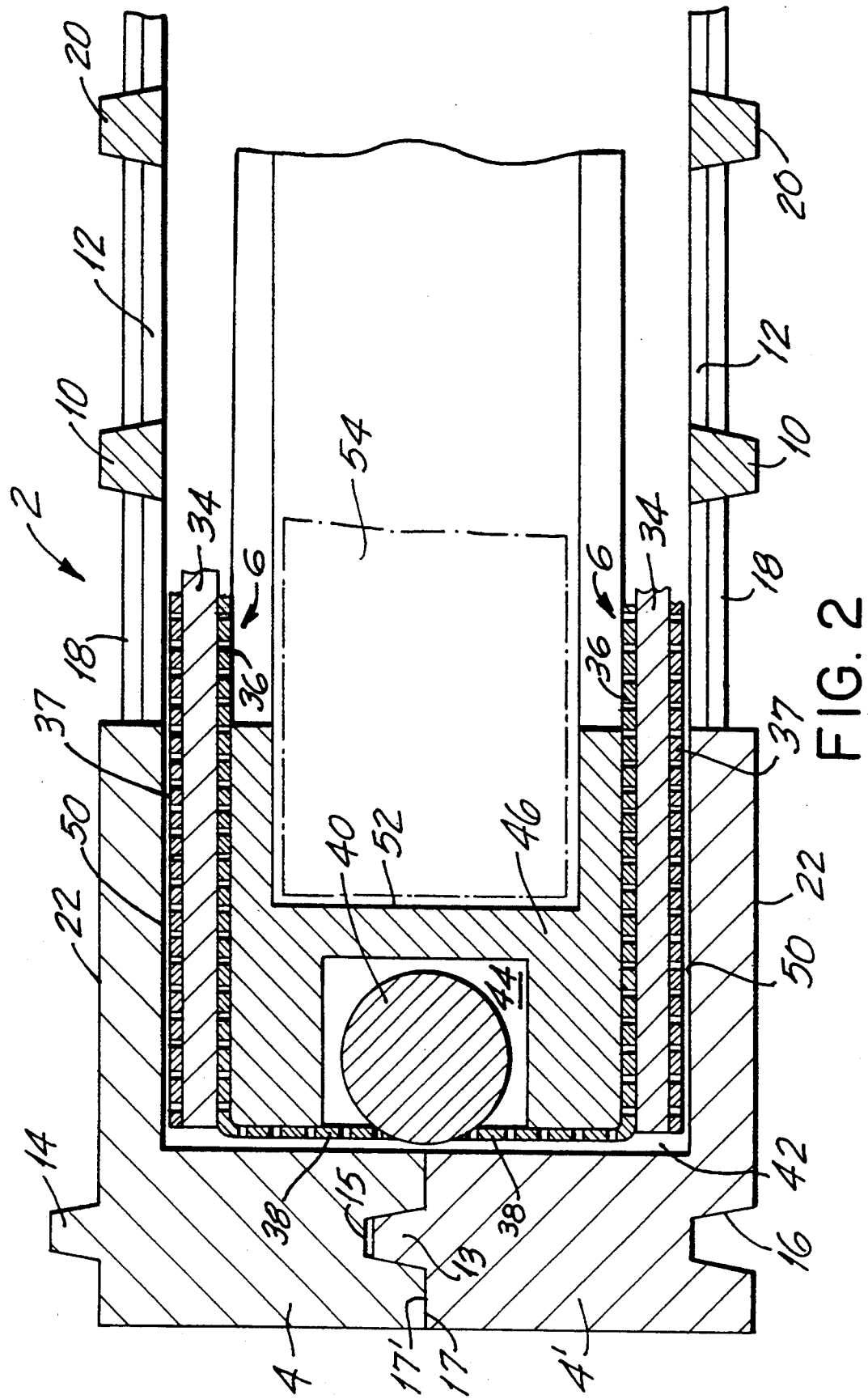
FIG. 2 is a partial view to an enlarged scale, in cross-section along plane II—II, of the cell of FIG. 1.

For proper registration of the two halves 4, 4' of the split housing when cementing them to one another, as well as for strengthening the cemented joint, tongues 13 and grooves 15 are provided at suitable locations along the mating edges 17, 17' (see FIG. 2). Similar tongue-and-groove features 14 and 16 are provided on the outer surfaces of the halves 4, 4', to facilitate the accurate joining of the cell housing and the well-defined juxtaposition, major surface to major surface, of any number of cells 2, and to prevent air leakages from between adjacent cells. These male-female interlocking features are important for reducing the need for external mechanical elements for module stability and rigidity.

Figure 3:
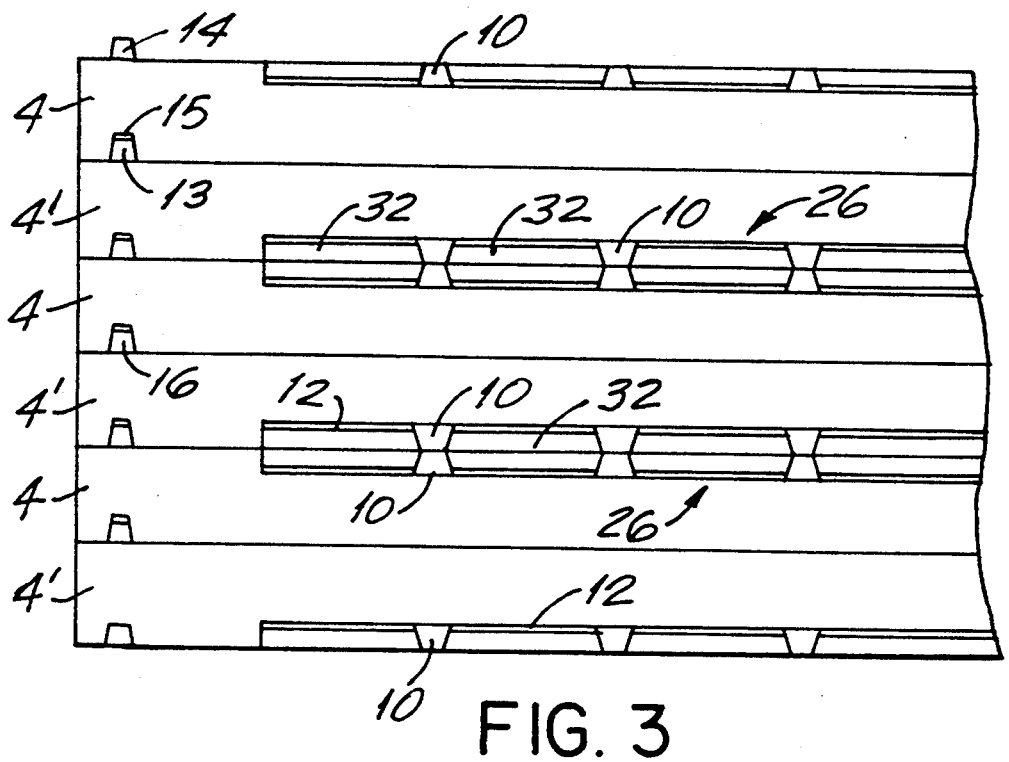
FIG. 3 is a bottom view of several juxtaposed cells, showing the air ducts produced by the rails of adjacent cell housings.

The surfaces 18 are slightly recessed, as is seen to best advantage in FIG. 2, while the top surfaces 20 of the rails 10 (see FIG. 2) are co-planar with the rims 22 and the upper surface portion 24 of the major surfaces of the housing 4, 4'. Thus, when the cells 2 are juxtaposed to form a battery, an air space is created in conjunction with a similarly recessed surface 18 of an adjacent cell 2, with an access 26 at the lower edge 28 of the cell 2 and exits 30 at the upper region of the lateral edges of the cell 2. The outer edges 19 of the lower recessed surfaces 18 are preferably rounded or chamfered to facilitate the entry of air into the air space between adjacent cells. FIG. 3 shows that the rails 10 of each cell define, with similar rails 10 of adjacent cells, ducts 32 for air entering the air space from below and exiting it at the exit slots 30. The latter are narrowed to produce a certain back-pressure required to ensure a substantially uniform distribution of air throughout all cells 2 in a string of cells. The air exiting slots 30 is led through a duct (not shown) formed between the string of cells of a battery and the casing (not shown) in which the battery is accommodated.

The upper edges of each cell 2 are designed with half of each edge protruding in the form of a lip 25 that, in a string of juxtaposed cells 2, will overlap the non-protruding edge half 25' of the adjacent cell 2, with the lip 25 of the adjacent cell overlapping the non-protruding edge half 25' of the first cell 2. During refueling, this will prevent dripping of the electrolyte into the air space between the cells 2. Instead, the electrolyte drips onto the lip 25 and is deflected into the interior of the cell 2.

Along the upper portion of the recessed surface 18, there are disposed a plurality of projections 27, the faces of which are substantially co-planar with the major surfaces of cell 2. These projections 27 prevent the recessed surfaces 18 which define the air ducts from being squeezed together to impede flow of air.

Delivery of air in predetermined quantities is required primarily for the chemical reaction and, secondarily, for cooling. The proper amount of air, based on a predetermined multiple of the stoichiometric quantity required for reaction and proportional to cell current, must reach all parts of the air electrode face evenly.

The air ducts 32 must be sufficiently large to allow unimpeded airflow with a minimum of pressure drop from one end of the battery string to the other, and sufficiently small to minimize the amount of air available at the surface of the air electrode 6 when the battery is not operating (or in an emergency situation). Moreover, the air ducts 32 must be sized and positioned so that the overall volume of the battery is minimized.

Upper surface portion 24 is provided with a fluid flow channel 72, having an inlet 74 provided in a wall 76 of a first minor surface of the cell 2. In the embodiment shown, an outlet 80 is provided in a wall 82 of an opposite minor surface, which, together with said fluid flow channel, provides guidance for a cooling fluid (not shown) introduced into the inlet 74. In a further embodiment (not shown), the inlet 74 and outlet 80 both appear on the same wall, the fluid flow channel having an extended length in the general form of a long, narrow U.

The cooling fluid is preferably a liquid; for example, a polyglycol.

Cooling is thus provided across the upper area of the cell 2, as the cooling fluid passes along the channel 72. The electrolyte (not shown) which is contained in the cell open space and is in contact with the rear face of the channel 72, thus transfers part of its excess heat to the cooling fluid in the well-known heat exchanger process.

In the preferred embodiment shown, the fluid flow channel 72 is in the form of a labyrinth 86 to maximize heat transfer. Other forms of fluid flow channels, such as a serpentine path, are also feasible. Convective circulation of the electrolyte within the open space of cell 2 is stimulated by the effect of the heat transfer at the top of the cell, causing a greater temperature gradient within the electrolyte within the cell, thereby increasing cooling effectiveness. It may be further noted that the vibration and other motions present in moving road vehicles are also helpful in this regard.

In the preferred form of construction shown, the fluid flow channel 72 is integrally formed as a meandering groove provided in the upper surface portion 24. A cover panel, which has been removed in the drawing to show the channel 72, seals and defines the flow path within the labyrinth 86. In a further embodiment (not shown), the flow channel is found within the upper surface portion 24; there is then no need for a cover panel.

Figure 5:
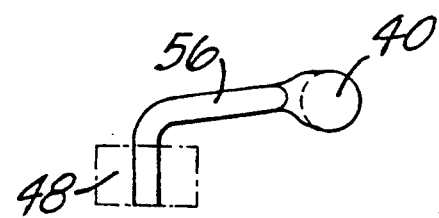
FIG. 5 is a top view of the electrode rod and the terminal clip attached to the flattened and bent end portion thereof.

The air cathodes 6 are clearly shown in FIG. 2. They must be air-permeable, but substantially impermeable to liquid electrolytes. The composition of their active material 34 has been explained in the two above-mentioned prior art disclosures, and each of them is advantageously compressed upon a conductive metal screen 36 in conjunction with a further preferred supporting plastic screen 37. As can be seen, the edge 38 of the screen 36 of each cathode is soldered to a metal collector element, advantageously in the form of a copper rod 40. This rod 40 (of which each cell 2 has two) is accommodated in a duct formed between the internal lateral walls 42 of the cell 2 and a groove 44 in a plastic, three-sided frame 46 having an H-shaped cross-section. Rod 40 extends along the entire cell 2 and emerges at the upper end thereof. The flattened and swung-out end of rod 40 (see FIGS. 1 and 5) carries a clip-like terminal 48, advantageously made of silver or any other highly conductive metal. The metal screens 36 are glued to the H-profile 46, while the plastic screens 37 are glued to the inside surfaces 50 of the cell 2.

The space defined by the groove 52 of the frame 46 is filled by the anode 54, indicated by dash-dotted lines and to be described further below.

Figure 4:
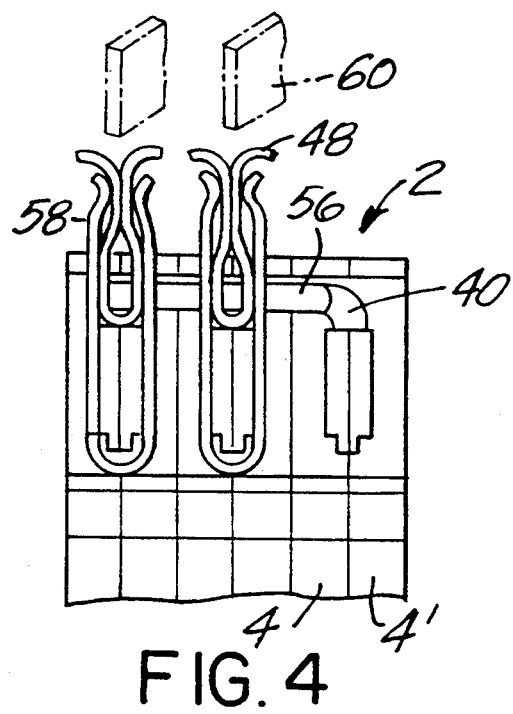
FIG. 4 is a partial side view, showing the arrangement of the cathode terminals.

As in a battery module the anodes and cathodes of adjacent cells are series-connected, it is clear that the cathode of one cell 2 must be connected to the anode of the adjacent cell 2. Therefore, as seen in FIG. 4, the terminal clip 48 of the first cell 2 must be offset, to be located in the center plane of the second cell 2, and so on. The shape of the end portion 56 of rod 40 is illustrated in the top view of FIG. 5. The end portion 56 is seen to be flattened and bent so that the terminal clip 48 clears the upper lateral end of the cell 2 and is offset by the proper distance to become co-planar with the anode 6 of the second cell 2.

Further seen in FIG. 4 are shaped steel springs 58 (not shown in FIG. 1), to provide the required contact pressure which the relatively soft clips 48 alone could not produce. The knife-like terminals 60 of the anodes 6 are indicated by dash-dotted lines.

Figure 7:
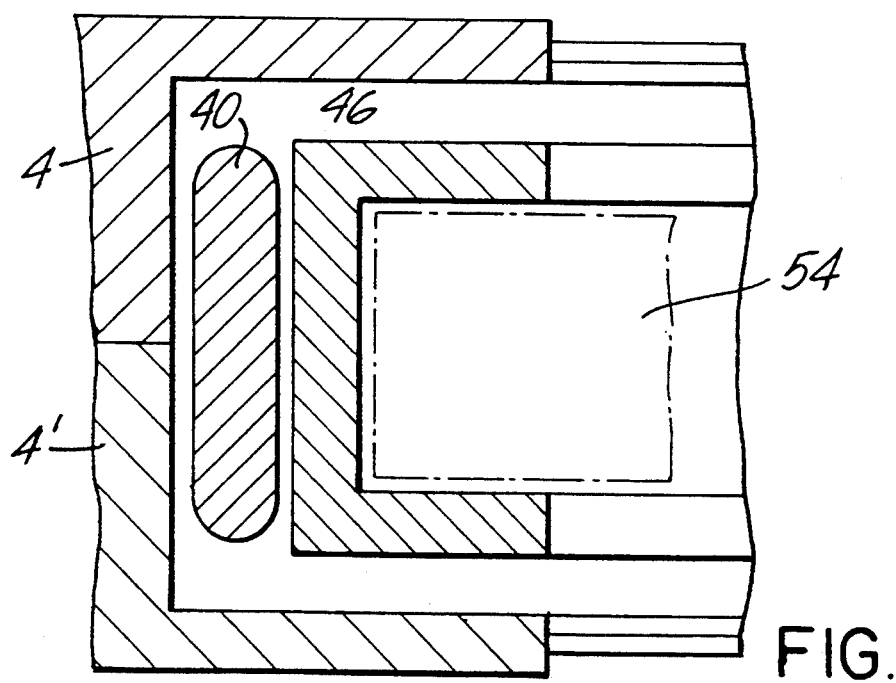
FIG. 7 illustrates a variant of the guide and positioning frame.

A variant of the guide and positioning frame 46 is seen in FIG. 7. Here, the frame 46 has a U-shaped cross-section and the current collector is a flat metal bar 40 accommodated in the space formed between the lateral inside wall 42 of the cell 2 and the vertical member of the frame 46. Clearly, the upper end (not shown) of the flat bar 40 must be suitably shaped to carry the terminal clips 48 of FIG. 4. FIG. 7 does not show the air electrodes 34.

Figure 6:
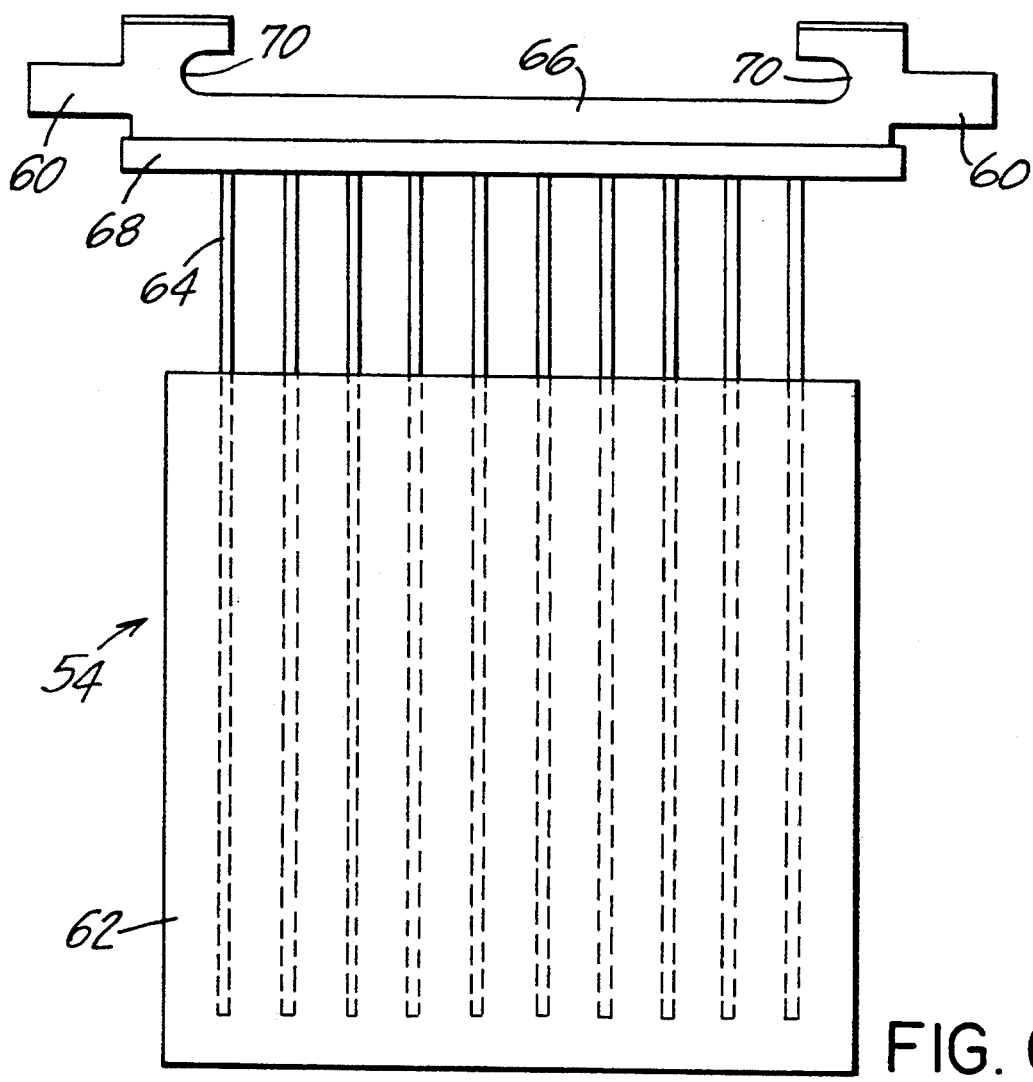
FIG. 6 illustrates the anode of the cell according to the invention.

The anode is illustrated in FIG. 6. It is seen to consist of the anode mass 62 proper, advantageously consisting of porous zinc granules impregnated with a suitable electrolyte, as explained in detail in the above-mentioned European Application, and pressed onto a number of conductors 64, preferably made of copper and connected to a yoke 66 which, at its ends, carries the knife contacts 60. Except for two small breather holes (not shown), a gasket 68 seals off the cell 2 when the anode 54 is inserted. Two undercuts 70 serve for application of an extractor tool for removal of exhausted anodes.

While the rails 10 and webs 12 that support and protect the air cathode 6 were shown as extending vertically and horizontally, respectively, it will be appreciated that other directions of these components are also possible. Thus, the air ducts defined by the rails 10 could even be slanting, or even meandering.

It will be appreciated that, while the terms "cementing", "glueing" and "soldering" have been used throughout the specification, they are by no means to be understood as limiting in any way, only being used as convenient examples of well-known joining methods and could be replaced by other, more efficient and up-to-date methods such as welding (ultrasonic, laser) and the like. In fact, it is projected to mold each of the cell halves 4, 4' complete with the air electrode 6 and the current collector 40 inside, and then to join the two halves 4, 4' by a welding process.

It should be noted that such directional indicators as "upper", "lower", "vertical" and "horizontal" were used not as limiting qualifiers, but only in order to facilitate understanding of the invention with the aid of the drawings appended and that, ideally, the components and features characterising the cells constituting the battery system according to the invention should be able to operate flawlessly also in positions and orientations other than those indicated, e.g., in FIG. 1.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A modular cell for a multi-cell metal-air battery system, comprising:
   a relatively flat cell housing having two major surfaces and accommodating a pair of oppositely disposed, spaced-apart, air-permeable, liquid-impermeable cathodes in the form of air electrodes defining between themselves a space open towards the upper edges of said cell housing and closed at the lateral edges and the bottom of said cell housing, said space being configured to accommodate an anode of said battery and electrolyte, substantial portions of the major surfaces of said housing being removed, thus exposing major portions of said air electrodes, characterized in that said two major surfaces are partly recessed in such a way as to form, in conjunction with a similarly recessed outer surface of a major wall of an adjacent cell housing, an air space with air access and exits, and that the exposed portions of said air electrodes are supported and reinforced by ribbing constituted at least by a plurality of slender rails, which rails define ducts for guiding a flow of air across said portions of said air electrodes from said air access toward said exits; and further characterized in that an upper portion of at least one major surface of said housing is provided with a fluid flow channel having an inlet and an outlet provided in a wall of a minor surface of said housing for guiding a cooling fluid introduced into said inlet across an upper area of said cell, in heat exchange with electrolyte contained in upper portions of said open space, via an inner wall of said housing portion.

2. The cell as claimed in claim 1, wherein said fluid flow channel is in the form of a labyrinth.

3. The cell as claimed in claim 1, wherein said fluid is a cooling liquid.

4. The cell as claimed in claim 1, wherein said fluid flow channel is integrally formed as a meandering groove provided in an upper portion of said housing.

5. The cell as claimed in claim 1, comprising a relatively flat cell housing constituted of two housing halves, said housing having two major surfaces and accommodating a pair of oppositely disposed, spaced-apart, air-permeable, liquid-impermeable cathodes in the form of air electrodes defining between themselves a space open towards the upper edges of said cell housing and closed at the lateral edges and the bottom of said cell housing, said space being configured to accommodate an anode of said battery, substantial portions of the major surfaces of said housing being removed, thus exposing major portions of said air electrodes, characterized in that said two major surfaces are partly recessed in such a way as to form, in conjunction with a similarly recessed outer surface of a major wall of an adjacent cell housing, an air space with air access at the lower edge of said cell housing and exits at least at the upper regions of the lateral edges thereof, and that the exposed portions of said air electrodes are supported and reinforced by ribbing constituted at least by a plurality of generally upwardly-extending rails, which rails define ducts for air entering said air space from below and exiting it at said upper regions.

6. The cell as claimed in claim 5, further comprising registering means provided along mating edges of said housing halves to facilitate the accurate joining thereof.

7. The cell as claimed in claim 1, wherein said air exits are in the form of narrowed slots.

8. The cell as claimed in claim 1, wherein said housing is a split housing.

9. The cell as claimed in claim 1, wherein said ducts are defined by said rails in conjunction with similar rails of adjacent cell housings.

10. The cell as claimed in claim 1, wherein said rails extend in a substantially vertical direction.

11. The cell as claimed in claim 10, further comprising a plurality of webs extending in a substantially horizontal direction and interlinking and reinforcing said rails, and further supporting and reinforcing said air electrodes, while creating a turbulent air flow within said ducts defined by said rails.

12. The cell as claimed in claim 10, further comprising a plurality of webs extending in a substantially diagonal direction and interlinking and reinforcing said rails, and further supporting and reinforcing said air electrodes, while creating a turbulent air flow within said ducts defined by said rails.

13. The cell as claimed in claim 11, wherein, closer to the bottom of said cell, spacing between said webs is reduced to provide more support where hydrostatic pressure is greater.

14. The cell as claimed in claim 1, further comprising first and second terminal means connected to said anode and said cathodes respectively, to facilitate a breakable series connection between the anode of one cell and the cathodes of a directly adjacent cell.

15. The cell as claimed in claim 14, wherein said second terminal means are provided with shaped springs to ensure adequate electrical contact between said first and said second terminals.

16. The cell as claimed in claim 1, further comprising registering means provided along the major outer surfaces of said housing, facilitating a well-defined and mechanically strengthened juxtaposition, major surface to major surface, of a plurality of said cell housings.

17. The cell as claimed in claim 1, wherein said air electrodes consist of an electrochemically-active material compressed upon a conductive metal screen.

18. The cell as claimed in claim 1, further comprising a partial, three-sided frame extending along the inner vertical edges and the inner bottom edge of said cell housing and having an H-shaped cross-section, one of the grooves forming said H-shape accommodating a rod-like current collector connecting at least one of said metal screens to said second terminals, the second one of said grooves forming said H-shape serving as guide and positioning groove for said anode.

19. The cell as claimed in claim 18, wherein the outer surfaces of said partial frame serve as spacers to said air electrodes, to which outer surfaces the marginal portions of the inner surfaces of said air electrodes are fixedly joined.

20. The cell as claimed in claim 18, wherein said three-sided frame has a U-shaped cross-section, the inside surfaces of which serve as guide and positioning surfaces for said anode.

21. The cell as claimed in claim 20, further comprising a current collector in the form of an elongated metal bar connecting at least one of said metal screens to said second terminals, said collector being located in a space formed between a lateral inside wall of said cell and a lateral member of said three-sided frame.

22. The cell as claimed in claim 1, wherein the upper edges of each cell are designed with half of each edge protruding in the form of a lip that, in any cell of a string of said modular cells, overlaps the non-protruding edge half of any directly adjacent cell, with the lip 0f said adjacent cell overlapping the non-protruding edge of the first cell.

23. The cell as claimed in claim 1, further comprising a plurality of projections disposed on portions of said recessed surfaces forming said air space for the purpose of preventing deformation of said recessed surfaces liable to impede air passage through said space.

* * * * *